United States Patent [19]
Rodriguez et al.

[11] Patent Number: 5,115,697
[45] Date of Patent: May 26, 1992

[54] DIAMOND ROTARY CUTTER FLUTE GEOMETRY

[75] Inventors: Arturo A. Rodriguez, Orem; Ronald B. Crockett, Provo, both of Utah

[73] Assignee: Smith International, Inc., Houston, Tex.

[21] Appl. No.: 745,811

[22] Filed: Aug. 16, 1991

[51] Int. Cl.$^5$ .............................................. B21K 5/04
[52] U.S. Cl. ........................... 76/108.6; 76/DIG. 11; 76/DIG. 12; 407/118; 407/119
[58] Field of Search ........... 76/108.6, 108.1, DIG. 11, 76/DIG. 12; 408/144, 199; 407/30, 32, 53, 56, 61, 62, 63, 118, 119

[56] References Cited

U.S. PATENT DOCUMENTS

| | | |
|---|---|---|
| 4,527,643 | 7/1985 | Horton et al. |
| 4,627,503 | 12/1986 | Horton . |
| 4,762,445 | 8/1988 | Bunting et al. |
| 4,991,467 | 2/1991 | Packer . |
| 5,020,394 | 6/1991 | Nakamura et al. |
| 5,031,484 | 7/1991 | Packer . |

*Primary Examiner*—Roscoe V. Parker
*Attorney, Agent, or Firm*—Robert G. Upton

[57] ABSTRACT

A diamond cutting tool is disclosed that forms at least a pair of grooves in the shank of the tool. The grooves contain sintered diamond prior to formation of concave flutes next to the grooves. The grooves are angled to form positive or negative cutter rake angles, whichever is desired. The adjacent concave flutes subsequently formed in the shank of the tool begin parallel with the cutting face of the sintered diamond and curve away from the base of the diamond back towards the surface of the shank. Sharpening of the diamond then results in very little removal of the diamond material thus assuring the integrity of the tool.

22 Claims, 2 Drawing Sheets

DIAMOND ROTARY CUTTER FLUTE GEOMETRY

CROSS REFERENCE TO RELATED PATENTS AND APPLICATIONS

This invention relates to U.S. Pat. No. 4,991,469 entitled DIAMOND TWIST DRILL BLANK filed Aug. 14, 1989 and U.S. Pat. No. 5,031,484 entitled DIAMOND FLUTED END MILL filed MAY 24, 1990.

BACKGROUND OF THE INVENTION

I. Field of the Invention

This invention relates to rotary cutting tools and more particularly to helically fluted cutting tools.

Helically fluted cutting tools such as end mills are generally required to perform severe machining operations under extremely adverse conditions. The cutting end of a helically fluted end mill includes at least a pair of cutting lips on opposite surfaces of the end mill blank.

Oppositely directed cutting surfaces positioned at the cutting end of the mill blank are subjected to axial and torsional loads which create material demands on the fabrication of the milling tool. Obviously the material of the cutting lips should be as hard as possible to cut a workpiece and it should be heat resistant as well to maintain the cutting edge of the mill at elevated temperatures. Moreover, the material of the body of the mill blank must be both rigid and tough to resist deflection and to maintain the integrity of the mill under loads while the mill cutter is being used. The foregoing requirements have resulted in compromises in material selection since hard materials tend to be brittle while tough materials tend to wear quite easily.

This invention has application for other types of rotary cutting tools such as router bits, drills, countersinks, counterbores, reamers, taps, and the like (not shown).

II. Description of the Prior Art

The prior art teaches a combination of materials having the characteristics of hardness and wear resistance at the cutting surfaces and toughness and rigidity of the body and shaft. It has been previously proposed to form the cutting surfaces of one material and the body and shaft of another. This has resulted in a variety of combinations such as tungsten carbide or diamond inserts or tips on carbon steel or carbide shafts. These combinations while individually useful have a common disadvantage, i.e. the braze connection between the insert or tip and a shaft. Tungsten carbide can be soldered or brazed directly to the steel or carbide shaft. However a diamond tip or insert must first be adhered to a carbide substrate which is in turn soldered or brazed to the shaft. Diamond particles are typically formed into a compact or PCD (polycrystalline diamond disc) and bonded to a carbide substrate with a metallic catalyst in a high pressure-high temperature press. At atmospheric pressures however, the metal which catalyzes the bonding of the diamond particles to each other and to the substrate in the press will also catalyze the conversion of diamond to graphite at temperatures above 700 degrees centigrade which will cause disintegration of the PCD compact. Accordingly, a low temperature solder or braze connection is used to attach the substrate to the shaft. The aforementioned diamond discs as well as the diamond insert stud blanks, for example, are fabricated from a tungsten carbide substrate with a diamond layer sintered to a face of a substrate, the diamond layer being composed of polycrystalline material.

The synthetic polycrystalline diamond layer is manufactured by Megadiamond Industries, Inc., a wholly owned division of Smith International, Prov, Utah. Another source of polycrystalline diamond is manufactured by the specialty material department of General Electric Company of Worthington, Ohio. The foregoing drill cutter blank is known by the trademark name of Stratapax Drill Blank.

Two examples of patents assigned to Megadiamond describe cutting elements for drilling holes. U.S. Pat. No. 4,527,643 teaches a cutting element for drilling holes which consists of five cutting edges which are comprised of polycrystalline diamond or the like mounted to a central carbide substrate of similar hard material held by a rotatable shaft which can be inserted into a drilling machine. The polycrystalline material is then supported with respect to torsional forces exerted upon it during drilling.

U.S. Pat. No. 4,.627,503 describes a polycrystalline diamond and metal elements for use as a cutting element for drilling holes or similar uses. The cutting element comprises a polycrystalline diamond center portion sandwiched between metal. The metal side portion is made from a soft metal having a Young's Modulus less than approximately 45 times 10 to the sixth power and is selected from a group comprising cobalt, nickel, iron, copper, silver, gold, platinum, palladium and alloys of these metals in metallic compunds containing these metals.

Both of these recently issued patents utilize a braze type bonding element to secure the diamond cutters within a drill blank. Typically a lower temperature solder or braze connection is used to attach the substrate to a shaft, such as the shaft of a helical twist drill. This braze connection limits the effective life of such drilling tools since it is softer than either the substrate or the shaft. The braze thus becomes the weakest point at the tool construction and the limiting factor in the tool usage.

U.S. Pat. No. 4,762,445 teaches a helically fluted twist drill apparatus in which offset opposed veins of sintered abrasive particulate, such as diamond, are embedded within a drill blank made of a less abrasive material such as carbide. The non-aligned veins of abrasive material themselves intersect through juxtapositioning adjacent the point and web of the drill. The veins of diamond are 180 degrees opposed across the tip of the helical drill blank. The opposing veins intersect at the center of axis of the helical drill to provide a concentration of diamond at the tip of the twist drill.

A disadvantage of the foregoing patent is that the veins of diamonds are relatively shallow at the tip of the twist drill and tend to wear out rather quickly.

The present invention overcomes the problems of the foregoing prior art by providing, for example, a concentration of diamond in each or at least a pair of preformed channels, the channels in the cutter blank are formed at an apporpriate rake angle that will minimize the removal of base material adjacent the diamond when forming the cutter bit flutes.

The above prior art forms radially aligned channeled grooves in cutter blanks prior to sintering of the diamond cutter material in the channels.

When the flutes in the shank of the tool are formed after the diamond sintering process secures the diamond in their respective channels, much of the leading edge of the formed diamond is removed or ground away, especially where it is desired to have a positive rake angle of the diamond with respect to a workpiece.

This invention teaches a means to form diamond containing channels that conform to the angle of the leading cutting edge of the sintered diamond whether the angle is positive, negative or ninety degrees to an adjacent workpiece.

By carefully forming diamond containing channels at the correct cutting angle, the flutes may be subsequently formed in the shank of the tool without removing sintered diamond for the channels, resulting in ease of removing material to form the flutes while maintaining the integrity of the sintered diamond during the diamond sharpening process.

The cutting tool will be longer lasting and cheaper to fabricate since the integrity and mass of the diamond is assured dring the tool fabrication process.

SUMMARY OF THE INVENTION

An object of the present invention is to provide a helically fluted cutting tool with a diamond cutting surface.

More particularly, it is an object of the present invention to provide a helically fluted cutting tool with a positive or negative rake angle for each of the helical grooves in the cutter blank that are filled with compacted polycrystalline or cubic boron nitride (CBN) diamond, the subsequently formed concave flutes conform to the angle of the grooves thus very little of the diamond or CBN is lost when the diamond or CBN is sharpened to the positive or negative rake angle.

The invention consists of a diamond rotary cutter comprising a rotary cutter blank forming first and second ends. The cutter blank further forms at least a pair of grooves in side walls formed by the cutter blank. The grooves substantially extend between the first and second ends.

The grooves further are radially oriented substantially at an angle that conforms to an angle of concave flutes that are subsequently formed adjacent the grooves in the rotary cutter blank.

The diamond material is then secured within the angled grooves formed in the side walls of the cutter blank. The diamond material and the cutter blank is subsequently machined to form the concave flutes and a cutting edge along an angled leading edge formed by the diamond material to form the rotary cutter.

Diamond powder material is compacted within the angled groove and sintered in a press.

The cutter blank is metallurgically bonded at the base end to a cutter shank thereby completing the cutting tool.

An advantage then of the present invention over the prior art is the angled diamond containing grooves adjacent the concave flutes, the edge of the flute adjacent a base of the sinterid diamond being substantially at the same angle as the grooves hence very little material is removed from the diamond during the formation of the flutes and the sharpening of the angled diamond material.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
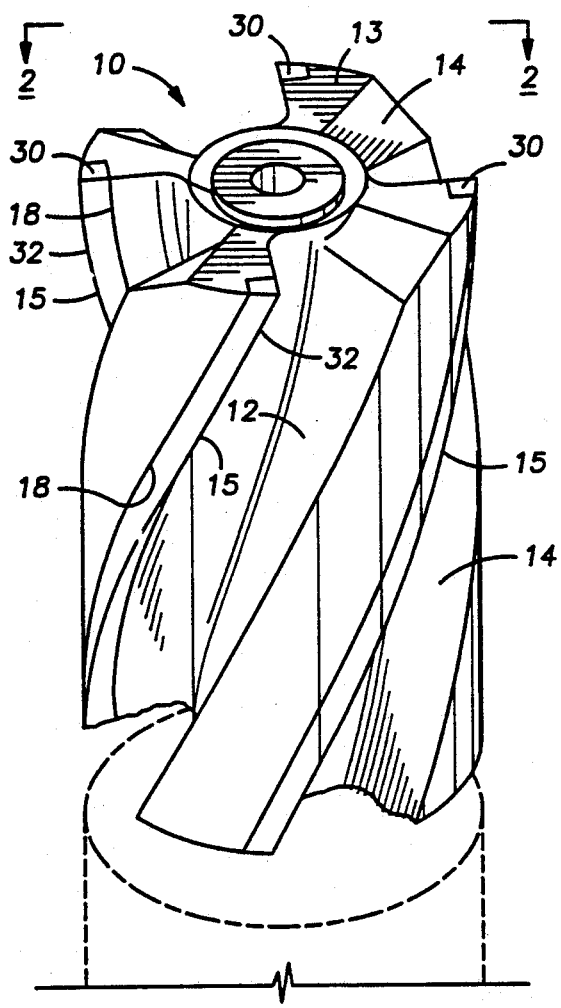
FIG. 1 is a perspective view of a fluted end mill.

The diamond end mill of FIG. 1 generally designated as 10 consists of an end mill blank body 12 having, for example, four flutes 14 circumferentially and equidistantly spaced aroung the body 12. The body 12 of the end mill may, for example, be fabricated from a hard and tough material such as tungsten carbide. A helical groove 18 is formed in the leading edge 15 of the flutes 14. The angle of the groove conforming to the shape of the subsequently formed flute 14. A sintered polycrystalline diamond 30 is pressed in the helically formed groove 18. Cutting lips 32 are ground into the sintered diamond material 30 pressed in the helical groove 18 formed by the flutes 14 of the drill blank 12. The tungsten carbide drill blank may then be metallurgically bonded to a steel or carbide drill shank 16 along juncture 17. The metallurgical bond may, for example, be a braze.

Figure 2:
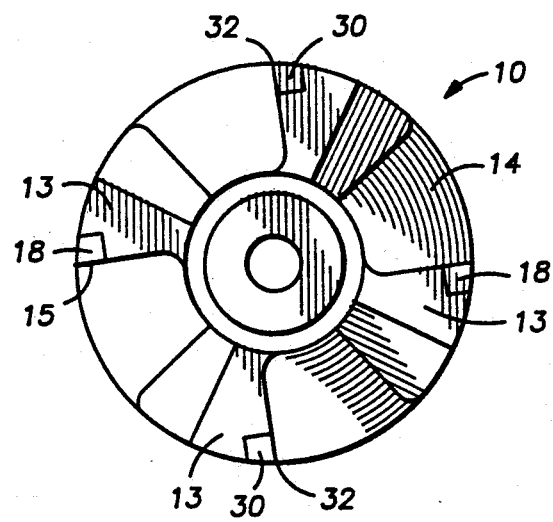
FIG. 2 is an end view taken throgh 2—2 of FIG. 1.

Turning now to FIG. 2, the end 13 of the mill 10 further illustrates the helically angled grooves 18 forming the leading edge 15 of the flutes 14. The polycrystalline diamond (PCD) or CBN 30 being subsequently compacted and sintered within the helical grooves 18. The flutes 14 and the cutting edge of lip 32 is ground into the PCD material after the sintering process is complete.

The sintering process is taught in detail in U.S. Pat. Nos. 4,991,467 and 5,031,484 assigned to the same assignee as the present invention. These two patents ae hereby incorporated by reference.

Since the flute angle conforms to the leading cutting edge of the sintered diamond, a minimum of grinding is required. This results in maximum diamond in the grooves with a minimum loss of diamond during the sharpening process (not shown).

Figure 3:
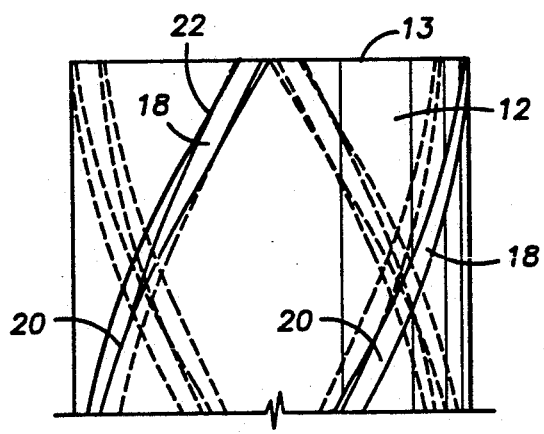
FIG. 3 is a perspective view of an end mill blank with four helical flutes machined therein.

Turning now to FIG. 3, the tungsten carbide drill blank body 12 is formed with, for example, four helically configured angled grooves 18 therein. The flutes 14 subsequently formed in the mill body after the diamond is sintered within groove 18. The helically formed grooves 18 are equidistantly spaced around the outer circumferential walls of the blank 12 and provide a receptacle for the PCD powder compacted therein. The angled sides 20 of the helical groove 18 preferably transition into a rounded bottom 22 of the groove 18. Identical sides 20 are formed in the other grooves 18. The reason for the rounded bottom 22 of the groove 18 is to assure that the polycrystalline diamond powder material is packed into the groove without any possibility of voids. If the sides of the groove were 90 degrees to the bottom 22 of the groove then the sharp 90 degree corners could cause stress risers and voids in the diamond material.

Figure 4:
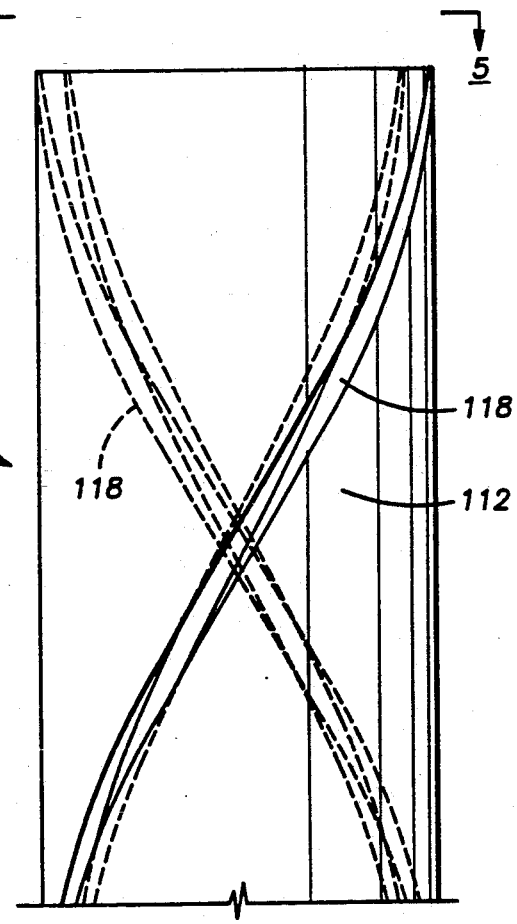
FIG. 4 is a side view of an end mill blank with a pair of helical flutes 180° one from the other.

With reference now to FIG. 4, an alternate end mill blank 110 is illustrated with a pair of helically angled grooves 118 formed in the blank body 112.

It would be obvious to provide diamond end mills with one or more angled grooves that substantially parallel an axis of the mill blank body (not shown).

It would additionally be obvious to provide cutters across the ends 13 and 113 of the blank bodies 12 and 112 to enhance plunging and milling operations without departing from the scope of this invention (not shown).

Figure 5:
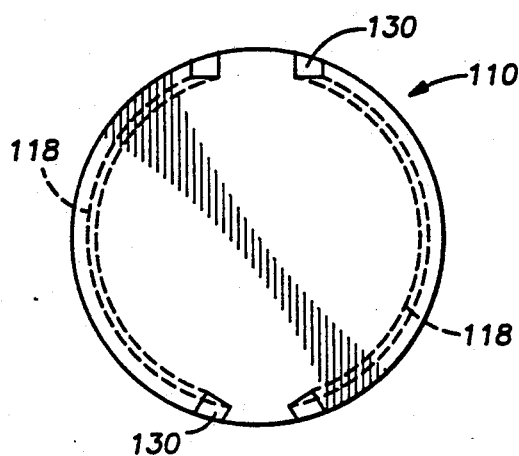
FIG. 5 is an end view taken through 5—5 of FIG. 4.

Referring now to FIGS. 1, 2 and 5, the angled grooves 18 and 118 are compacted with diamond powder 30 and 130 and sintered in a press. The polycrystalline diamond material 30 then is formed in the angled helical grooves 18 of the tungsten carbide blank body 12. A solid mass of diamond in angled grooves 18 and 118 is thus formed in the blank side walls of the end mill bodies 12 and 112. The end mill blank is then subsequently machined to form the flutes 14. A following grinding process forms the cutting gage surface or lips 32 on the sides of the blank bodies 12 and 112 with a minimum loss of diamond since the groove 18 and 118 is cut to conform to the angle of the flutes formed in the body 12.

Figure 6:
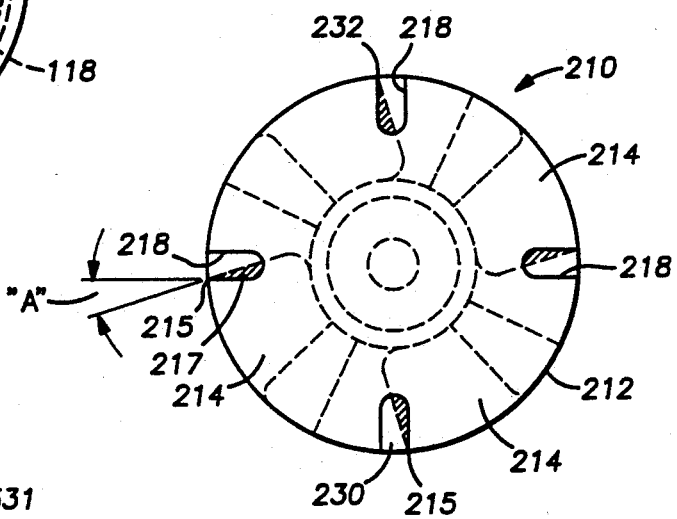
FIG. 6 is a cross-section of the prior art fluted cutter blank illustrating the radially aligned flute channels retaining sintered diamond therein.

The prior art of FIG. 6 illustrates a cross-section of an end mill 210 with grooves 218 formed in the shank body 212. The diamond material 230 and groove 218 are oriented radially hence, when the flute 214 is formed in the shank 212 and the diamond material is sharpened, at least one third of the diamond material 230 is lost as is indicated in the shaded area 217.

This loss of diamond is especially damaging when a positive cutter rake angle "A" is desired. Not only is it time consuming to grind the diamond material 230, it is very hard on the tool sharpening devices (not shown). Moreover, the resultant loss of diamond shortens the life of the diamond cutting tool generally designated as 210.

Figure 7:
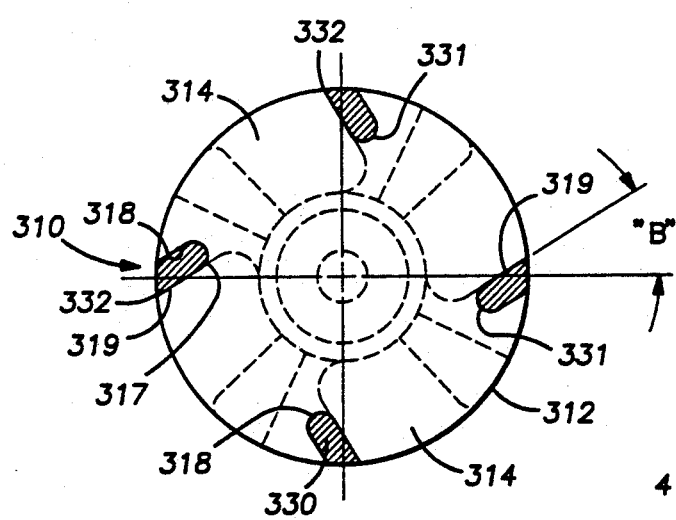
FIG. 7 is a cross-section of a fluted cutter blank with angled flutes intersecting a radial line resulting in a diamond cutting edge at a positive rake angle.

Turning now to FIG. 7, the groove 318 is angled from a radial plane such that the groove now is in line with the concave flutes 314. In addition, the cutting edge 332 of the diamond material 330 is at a positive rake angle with respect to an adjacent work piece (not shown). Angle "B" determines the degree of rake angle of the cutting edge 332.

When the flutes 314 are formed in the shank 312, material is removed parallel with cutting face 319 and tangents the base 317 of the diamond material 330. Obviously, very little diamond material is removed during the flute forming and diamond sharpening process.

When compared to the prior art of FIG. 6, it can readily be observed that the pre-determined angle of the groove 318 enables the cutting tool 310 to be much more durable hence, longer lasting.

Figure 8:
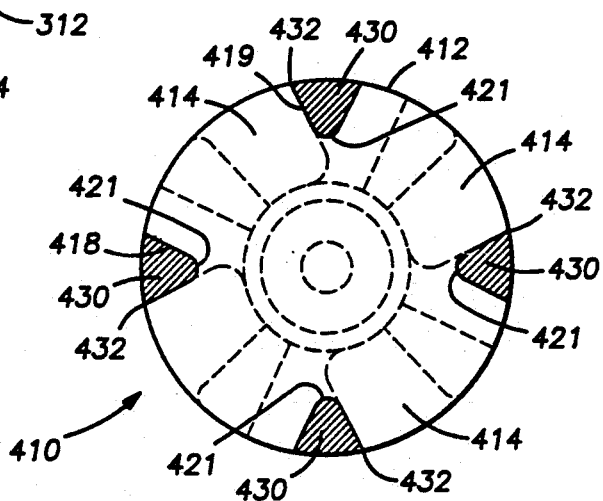
FIG. 8 is a cross-section of a fluted cutter blank with a "V" groove intersecting a radial line which also results in a diamond cutting edge at a positive rake angle with respect to a work piece.

FIG. 8 depicts another embodiment wherein the groove 418 in the shank 412 of the cutter 410 is formed in a "V", the bottom of the "V" being rounded at 421. Rounding at the base 421 as well as rounding out the base 331 (FIG. 7) to assure that the diamond powder is well compacted was heretofore described with reference to FIG. 3.

The leading cutting face 419 again is at a positive rake angle whereby the cutting edge 432 is at a positive angle with respect to an adjacent workpiece (not shown). Again, the flute is formed along the face 419 and transitions from the diamond face 419 at base 421 thus requiring little removal of material from the diamond during the flute forming and diamond sharpening process as heretofore described.

It would be obvious to form the diamond grooves and flutes opposite or at a negative rake angle from that which has been described without departing from the scope of this invention.

It would additionally be obvious to form the grooves and flutes without hellical paths without departing the scope of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A diamond rotary cutter comprising:
   a rotary cutter blank forming first and second ends, said cutter blank further forming at least a pair of grooves in side walls formed by said blank said groove substantially extending between said first and second ends,
   said grooves further being radially oriented substantially at an angle that conforms to an angle of concave flutes that are subsequently formed adjacent said grooves in said rotary cutter blank, and
   diamond material secured within said grooves formed in said side walls, said diamond material and said cutter blank is subsequently machined to form said flutes and a cutting edge along an angled leading edge formed by said diamond material to form said rotary cutter.

2. The invention as set forth in claim 1, wherein, connecting means to attach said second base end of said cutter blank to a cutter shank is provided.

3. The invention as set forth in claim 2, wherein, said cutter shank is steel.

4. The invention as set forth in claim 3, wherein, said cutter shank is carbide.

5. The invention as set forth in claim 2, wherein, said connecting means attaching said cutter blank to said steel cutter shank is a metallurgical bond.

6. The invention as set forth in claim 5, wherein, said metallurgical bond is a braze.

7. The invention as set forth in claim 1, wherein, said diamond material is a matrix of polycrystalline diamond powder and cobalt pressed into said angled grooves, the diamond matrix being subsequently sintered to said first rotary cutter blank.

8. The invention as set forth in claim 1, wherein, said diamond material is cubic boron nitride.

9. The invention as set forth in claim 1, wherein, said cutter blank is tungsten carbide.

10. The invention as set forth in claim 1, wherein, said angled grooves are oriented at a positive rake angle with respect to an adjacent workpiece.

11. The invention as set forth in claim 1, wherein, said angled grooves are oriented at a negative rake angle with respect to an adjacent workpiece.

12. The invention as set forth in claim 11, wherein, said grooves are formed in a "V", a cutting leading edge being oriented with a positive rake angle with respect to said workpiece.

13. A process for forming a diamond rotary cutter comprising the steps of:
   forming a cutter blank of hard metal, said cutter blank having a first cutting end and a second base end, said cutter blank forming at least a pair of grooves from said first cutting end and extending toward said base end, said grooves being radially oriented and formed at an angle that substantially conforms to an angle of concave flutes that are subsequently formed in said rotary cutter blank,
   filling said angled grooves formed in said cutter blank with diamond material,
   bonding said diamond material in said grooves in said cutter blank in a press,
   forming said concave flutes at an intersection substantially at a base of said angled grooves, and
   grinding said diamond material sintered in said grooves formed by said end mill blank thereby providing a diamond cutting edge along a leading edge of said sintered diamond material.

14. The process as set forth in claim 13, wherein, said hard metal is tungsten carbide.

15. The process as set forth in claim 13, wherein, said diamond material is polycrystalline diamond.

16. The process as set forth in claim 13, wherein, said diamond material is cubic boron nitride.

17. The process as set forth in claim 13, wherein, said diamond material is a matrix of polycrystalline diamond powder and cobalt.

18. The process as set forth in claim 13 further comprising the step of forming sloped side walls in the shape of a "V" in said cutter blank for said grooves, said "V" grooves being narrower in the bottom of said groove than a width of said groove at a surface formed by said cutter blank, said sloped side walls assure compaction of said polycrystalline diamond matrix without voids and provide a positive rake angle with respect to an adjacent workpiece, after the concave flute is formed in said cutter blank.

19. The process as set forth in claim 13 further comprising the step of forming said grooves with a positive rake angle with respect to an adjacent workpiece.

20. The process as set forth in claim 13 further comprising the step of forming said grooves with a negative rake angle with respect to an adjacent workpiece.

21. The process as set forth in claim 13 further comprising the step of metallurgically bonding a mill shank to said second base end of said end mill blank.

22. The process as set forth in claim 21, wherein, said metallurgical bond is a braze.

* * * * *